US011519705B1

(12) United States Patent
Triplett

(10) Patent No.: US 11,519,705 B1
(45) Date of Patent: Dec. 6, 2022

(54) CARTRIDGE CASE VOLUME MEASUREMENT SYSTEM

(71) Applicant: Ben Triplett, Washougal, WA (US)

(72) Inventor: Ben Triplett, Washougal, WA (US)

( * ) Notice: Subject to any disclaimer, the term of this patent is extended or adjusted under 35 U.S.C. 154(b) by 0 days.

(21) Appl. No.: 17/412,156

(22) Filed: Aug. 25, 2021

Related U.S. Application Data

(60) Provisional application No. 63/070,204, filed on Aug. 25, 2020.

(51) Int. Cl.
*F42B 35/02* (2006.01)
*G01B 5/00* (2006.01)

(52) U.S. Cl.
CPC ............ *F42B 35/02* (2013.01); *G01B 5/0021* (2013.01)

(58) Field of Classification Search
CPC .............................. F42B 35/02; G01B 5/0021
USPC ............................................................ 33/506
See application file for complete search history.

(56) References Cited

U.S. PATENT DOCUMENTS

| | | | | |
|---|---|---|---|---|
| 2,403,032 A * | 7/1946 | Stevens, Jr. | ............. | F42B 35/02 86/19 |
| 4,248,132 A * | 2/1981 | Blomseth | ................ | F42B 35/02 86/24 |
| 4,918,825 A * | 4/1990 | Lesh | ....................... | F42B 35/02 42/1.07 |
| 6,151,788 A * | 11/2000 | Cox | ........................ | G01B 11/27 33/286 |
| 10,240,907 B2 * | 3/2019 | Berger | ..................... | F42B 35/02 |
| 10,265,774 B1 * | 4/2019 | Eldredge | ................. | F42B 33/10 |
| 10,746,518 B1 * | 8/2020 | Copenhaver | ............ | F42B 33/10 |
| 11,300,394 B2 * | 4/2022 | Kinney | .................... | F42B 35/02 |
| 2003/0126754 A1 * | 7/2003 | Berger | .................... | F42B 35/00 33/506 |

* cited by examiner

*Primary Examiner* — George B Bennett

(74) *Attorney, Agent, or Firm* — Rylander & Associates, PC; Philip R. M. Hunt

(57) ABSTRACT

The cartridge case volume measurement system determines case capacity by sealing the internal system volume, and then changing it by a fixed amount. The resulting change in internal pressure of the system is measured and used to compute the volume of the case. The internal system volume includes the volume of the case, the volume inside a master cylinder that is behind a master piston, the volume inside any sensors, tubing, and channels that are part of or connected to the master cylinder. A computing device uses the ideal gas law in conjunction with calibration of the system using cases of known capacity in order to compute case volume from the change in internal pressure resulting from the change in volume.

14 Claims, 4 Drawing Sheets

CARTRIDGE CASE VOLUME MEASUREMENT SYSTEM

CROSS-REFERENCE TO RELATED APPLICATIONS

This application claims the benefit of U.S. Provisional Application No. 63/070,204, filed 2020 Aug. 25, incorporated herein by reference.

TECHNICAL FIELD

This specification relates to measurement of the volume contained within an apparatus or component that has an internal volume. In particular, the present specification relates to measurement and/or estimation of the internal volume of a firearm cartridge case.

BACKGROUND

Long range precision rifle shooting relies on consistent bullet muzzle velocity to reliably hit a target or to manage high scores in competition based on accuracy. Every rifle cartridge caliber has a nominal empty cartridge case volume associated with it. Variation in the actual case volume (aka case capacity) within a lot of cartridge cases will result in commensurate variation in muzzle velocity all else being equal. In practice, determination of the capacity of a given cartridge case is done by measuring the weight of the empty case, filling the case with a material, usually water, and then weighing the full case. The volume of the case is computed from the weight of water that filled the case.

The volume by water weight method for measuring case capacity is time consuming, inconvenient, messy, and results in a cartridge case that is wet internally and must be dried before use.

What is needed is a way to measure case capacity that is precise, convenient, reliable, and fast, and that allows immediate loading of the cartridge case after measurement.

SUMMARY

The cartridge case volume measurement system determines case capacity by sealing the internal system volume, and then changing it by a fixed amount. The resulting change in internal pressure of the system is measured and used to compute the volume of the case. The internal system volume includes the volume of the case, the volume inside a master cylinder that is behind a master piston, the volume inside any sensors, tubing, and channels that are part of or connected to the master cylinder.

The ideal gas law is used in conjunction with calibration of the system using cases of known capacity in order to compute case volume from the change in internal pressure resulting from the change in volume.

This system is superior to prior systems because it uses air as the medium for measurement instead of a liquid or powder solid. The system makes measurements very quickly as it can be sealed with a simple gasket, and the internal change in volume is easily accomplished by a simple mechanism. Many ways exist to measure the change in pressure and compute the results, such as the use of commercial off-the-shelf (COTS) electronic sensors and a custom computer program.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures.

DETAILED DESCRIPTION

In describing the one or more representative embodiments of the inventive subject matter, use of directional terms such as "upper," "lower," "above," "below", "in front of" "behind," etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. The scope of the inventive subject matter should not be limited by the particular embodiments herein described but should be defined only by the appended claims and equivalents thereof.

First Representative Embodiment

Figure 1:
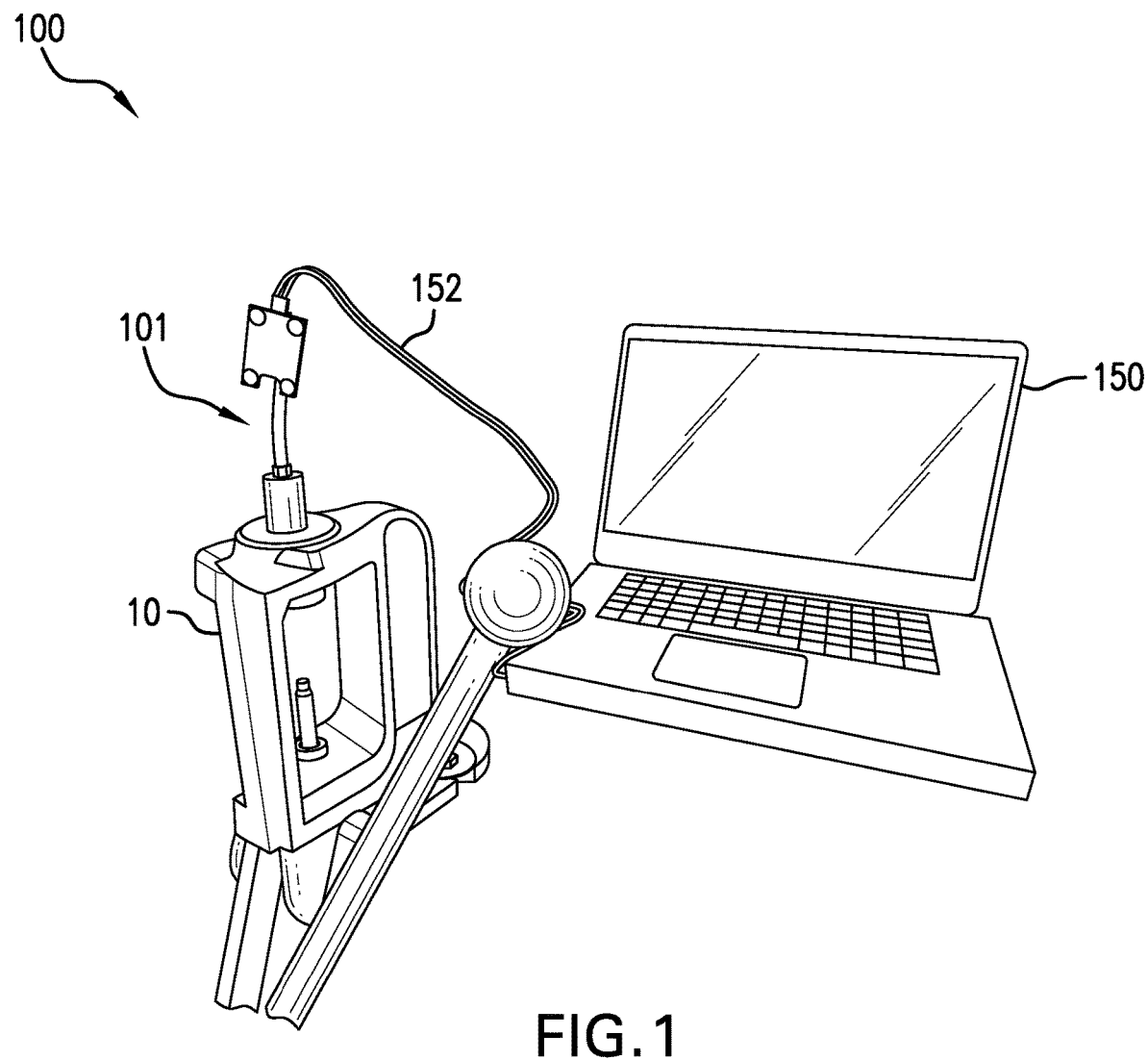
FIG. 1 is a view of the first representative embodiment of the cartridge case volume measurement system.

FIG. 1 shows a first embodiment cartridge case volume measurement system 100 comprising a cartridge case volume measurement assembly 101, a computing device 150, and a communication cable 152 coupling the cartridge case volume measurement assembly 101 and the computing device.

Figure 2:
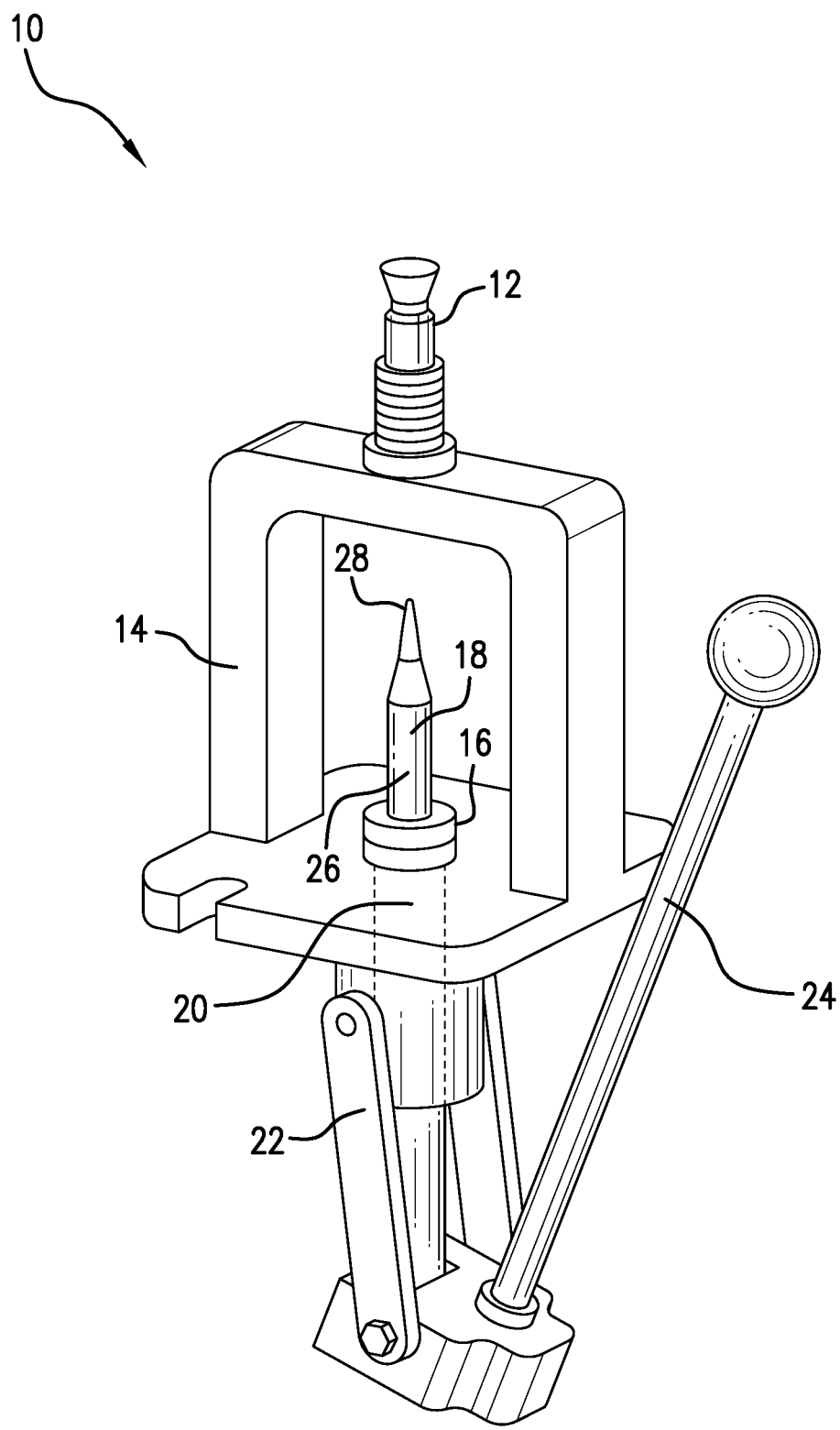
FIG. 2 is a view of a reloading press of the first embodiment cartridge case volume measurement system.

The first embodiment system 100 uses a typical ammunition reloading press 10. FIG. 2 shows a typical reloading press 10 having a loading press frame 14, a shell holder 16, a ram 20, a linkage 22 and a lever 24. The shell holder 16 is configured to hold a cartridge 18 comprising a cartridge case 26 and a bullet 28. The loading press frame 14 is configured for a die 12 to attach to the loading press frame 14, typically with threads of the die 12 engaging with threads in a die hole in the top of the loading press frame 14. The ram 20 is coupled to the shell holder 16 and coupled via a linkage 22 to a lever 24. The reloading press 10 is configured such that when the lever 24 is pulled down by a user, the linkages 22 moves the ram 20 upward, driving any cartridge 18 in the shell holder 16 into the die 12. In the first embodiment system 100, the die 12 on the reloading press 10 is replaced with the cartridge case volume measurement assembly 101 as shown in FIG. 1. When measuring the volume of a cartridge case 26 with the first embodiment cartridge case volume measurement system 100, a cartridge case 26 without a bullet 28 is used.

Figure 3:
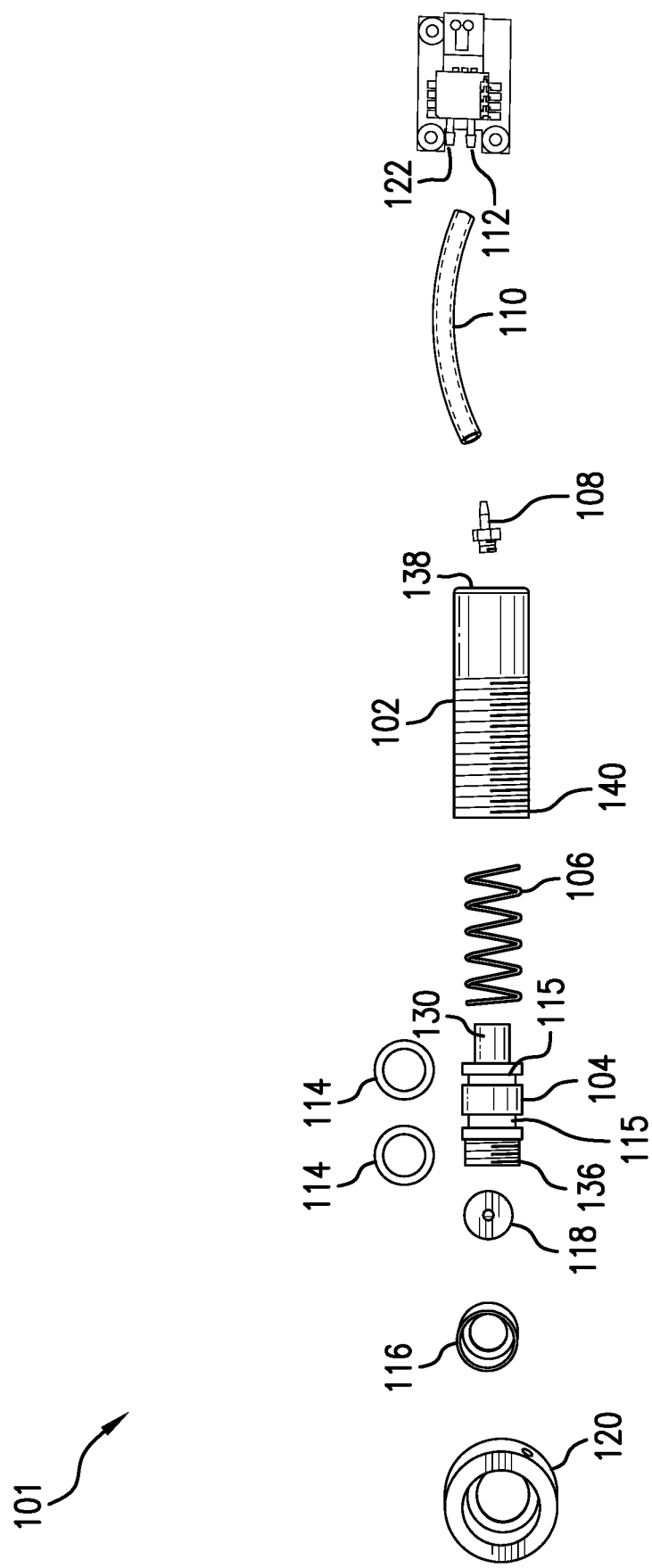
FIG. 3 is an exploded side view of the cartridge case volume measurement assembly of the first embodiment cartridge case volume measurement system.

FIG. 3 shows an exploded side view of the cartridge case volume measurement assembly 101. The cartridge case volume measurement assembly 101 comprises a master cylinder 102, a master piston 104, a gasket 118, a gasket retention cap 116, a piston retention cap 120, a first pressure sensor 112, a second pressure sensor 122 and a coil spring 106.

Figure 4:
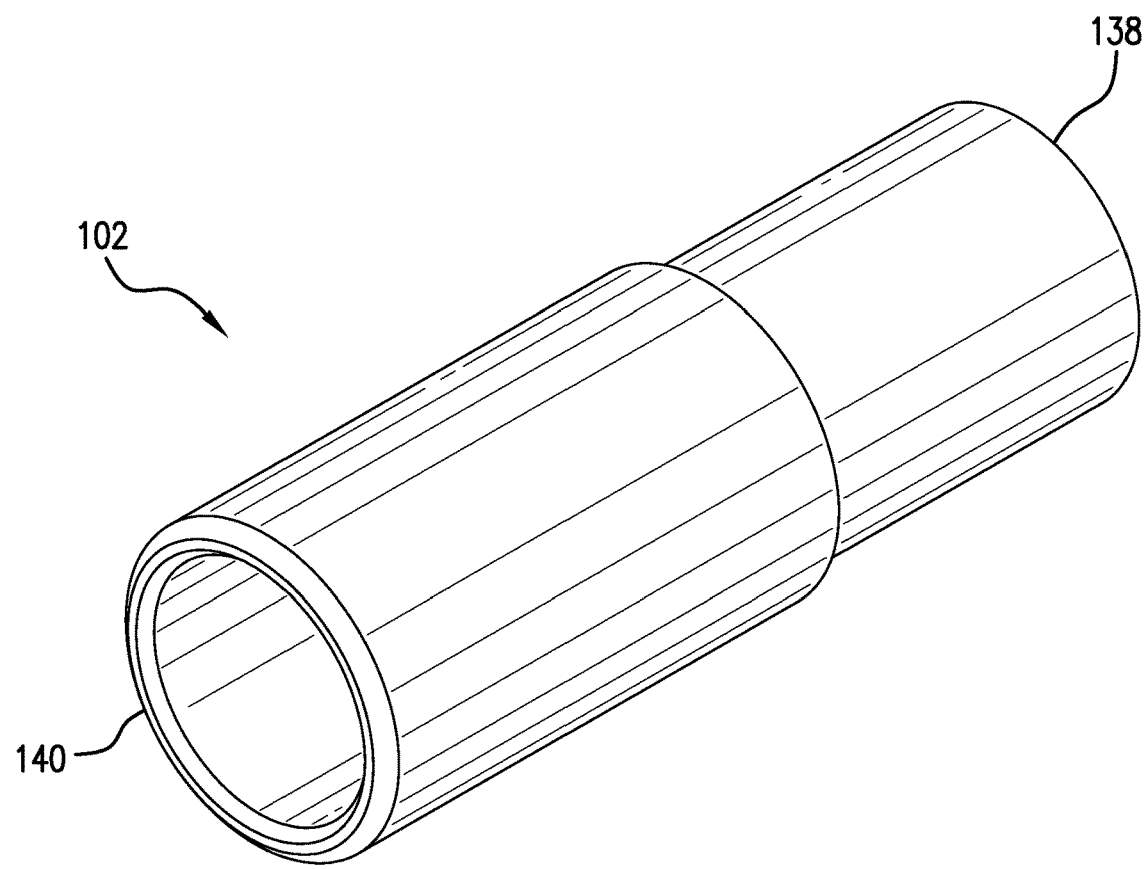
FIG. 4 is a perspective view of the master cylinder of the cartridge case volume measurement assembly.
Figure 5:
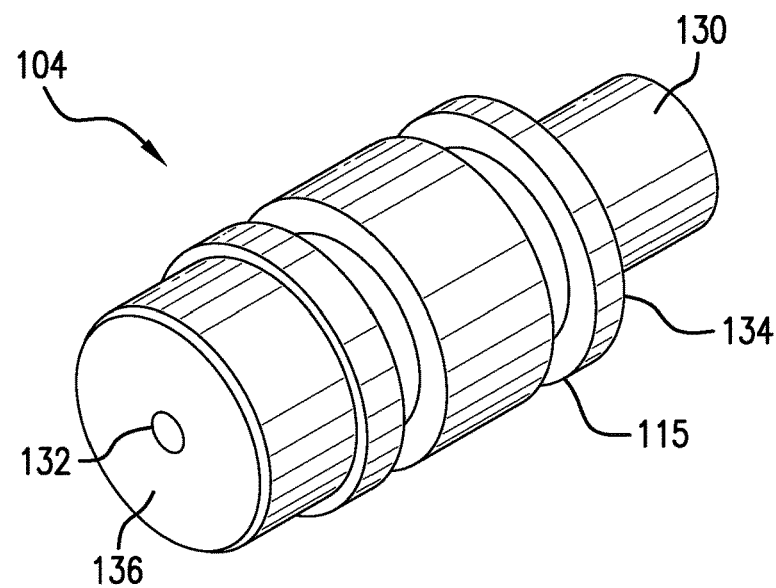
FIG. 5 is a perspective view of the master piston of the cartridge case volume measurement assembly.

FIG. 4 is a perspective view of the master cylinder 102. FIG. 5 is a perspective view of the master piston 104. The master cylinder 102 has threads on its outside surface configured to engage with the threads in the hole in the loading press frame 14. The master cylinder 102 has an open end and a closed end 138. The master piston 104 fits slidingly inside the master cylinder 102. The piston retention cap 120 couples with the open end 140 of the master cylinder 102, typically with threading. The piston retention cap 120 has a hole which is large enough to allow a cartridge case 26 to pass through, but small enough to prevent the master piston 104 from passing through. The master piston 104 has two O-rings 114 that fit in circumferential grooves 115 in the master piston 104 to provide an air-tight seal between the master cylinder 102 and the master piston 104. The master piston 104 is configured to slide within the master cylinder 102 from a position of maximum extension to a position of maximum compression. The coil spring 106 is located inside the master cylinder 102 between the master piston 104 and an inner back surface of the master cylinder 102 to provide a restoring force that returns the master piston 104 to its fully extended position. The master piston 104 has a gasket 118 positioned on a first end 136 (outside face) of the master piston 104 and held in place on the master piston 104 with a gasket retention cap 116 coupled to the master piston 104, typically with threading. The gasket retention cap 116 has a hole which is large enough to allow a mouth of cartridge case 26 to pass through, but small enough to prevent the gasket 118 from passing through. The gasket 118 is configured to seal against a mouth of the cartridge case 26. At maximum extension of the master piston 104 an outward face of the gasket retention cap 116 rests on an inner face of the piston retention cap 120. At maximum compression of the master piston 104 a raised boss 130 on a second end 134 (back side) of the master piston 104 rests against an inner back surface of a closed end 138 of the master cylinder 102. The raised boss 130 has cross-section smaller than the inside diameter of the master cylinder 102. The raised boss 130 allows the master cylinder 102 to reach its maximum extension without forcing all the air out of the master cylinder 102. Appropriate sizing of the raised boss 130 and the master cylinder 102 results in an internal volume change for a fixed stroke distance that will produce useful pressure change measurement without over pressuring the system.

The difference between the maximum extension and the maximum compression define a fixed stroke distance for the master piston 104.

The master piston 104 has a hole 132 through its longitudinal axis of symmetry to allow air to flow through it. The master cylinder 102 has a hole at the closed end 138 (back end) of the master piston 104 that the first pressure sensor 112 connects to via a pressure coupling 108 and a tube 110. This provides a conduit for the measurement of the change in pressure of the internal volume of the system by the first pressure sensor 112. In the first embodiment cartridge case volume measurement system 100 the first pressure sensor 112 is a differential pression that measures the difference in pressure between the internal volume of the system and ambient, but in other embodiments may be an absolute pressure sensor that measures just the pressure of the internal volume of the system. The second pressure sensor 122 is an absolute pressure sensor that measures the pressure of the ambient atmosphere. Measurements by the first pressure sensor 112 and the second pressure sensor 122 are transmitted to the computing device 150 by the communication cable 152.

The internal volume of the system is the volume of the cartridge case 26 being measured plus additional volume of the cartridge case volume measurement assembly 101. Specifically, the volume of the cartridge case volume measurement assembly 101 is the volume inside the piston hole 132, plus the volume inside the master cylinder 102 between the master piston 104 and the inner back surface of the master cylinder 102, plus the volume in the pressure coupling 108, tube 110, and the first pressure sensor 112. The internal volume of the system is sealed when the mouth of the cartridge case 26 is pushed by the ram 20 up through the piston retention cap 120 and against the gasket 118 of the master piston 104. Once the internal volume of the system is sealed, the master piston 104 is driven by the ram 20 through the fixed stroke distance inside the master cylinder 102, resulting in a fixed volume change in the internal volume of the system, due to the change in the volume in the master cylinder 102 between the master piston 104 and the inner back surface of the master cylinder 102.

The volume of the cartridge case 26 is determined from this fixed volume change, calibration data, and the measurements from the second pressure sensor 122 and first pressure sensor 112. The calibration data is based on measurements with cartridge cases of known volume.

Volume Computation Equations $p_1 v_1 = p_2 v_2$ Ideal gas law assuming constant temperature Let $\Delta v = v_1 - v_2$ and $\Delta p = p_1 - p_2$ And note that the system starts at atmospheric pressure $p_1 = p_a$ Re-arrange the ideal gas law above to get $$v_2 = \frac{\Delta v}{\Delta p} p_a$$

The internal volume of the system is the volume of the cartridge case 26 being measured plus additional volume of the cartridge case volume measurement assembly 101. Denote this additional volume as $v_{app}$ to indicate the volume of the apparatus not including the cartridge case 26. Without loss of generality we take this to be the volume of the apparatus at full compression so that $v_2 = v_{app} + v_c$ where $v_c$ is the volume of the cartridge case. Then $$v_c = \frac{\Delta v}{\Delta p} p_a - v_{app}$$

Calibration of the system determines $\Delta v$ and $v_{app}$, using measurements of $\Delta p$ and $p_a$ from two or more cartridge cases with distinct known volumes. The calibration problem is then easily solved with a least squares approach.

The first embodiment system 100 uses the computing device 150 to receive the pressure measurements from the first pressure sensor 112 and second pressure sensor 122 via the communication cable 152, compute and store calibration data, and to compute the resulting cartridge case volumes. Custom software is used to affect the computations.

Many alternative embodiments of the first embodiment cartridge case volume measurement system 100 are possible. In some embodiments, the external absolute pressure in the computation is not used but omitting it does make the resulting case volume estimates less precise. Multiple redundant sensors can also be used to increase the accuracy of the measurements. The external absolute pressure, incorporated into the computation of case volume, is beneficial to the numerical computations because it makes the computations less sensitive to measurement errors inherent in the digital electronic pressure sensors.

Second Representative Embodiment

A second representative embodiment of the cartridge case volume measurement system has one end of the master cylinder 102 configured to form a seal with the cartridge case 26, and a secondary piston is operated separately in a secondary cylinder to affect the change in internal volume needed to infer the capacity of the cartridge case 26. In this second embodiment system, the cartridge case 26 is not used to drive the master piston 104 (typically omitted in the second embodiment system) as in the first embodiment system 100 but is stationary after contacting and forming a seal with the master cylinder 102 while a secondary piston is actuated in the secondary cylinder. This secondary cylinder is connected to the master cylinder so that its volume is part of the total internal volume of the system. The principle of operation is the same as the first embodiment system 100, in which a predetermined change in the internal volume of the system results in a change in pressure, from which the volume of the cartridge case 26 is determined.

What is claimed is:

1. A cartridge case volume measurement system comprising:
    a cartridge case volume measurement assembly having:
        a master cylinder with an open end and a closed end, wherein the master cylinder is configured for coupling to a die hole in a reloading press;
        a master piston fit slidingly inside the master cylinder, wherein the master piston has a master piston center hole;
        a gasket on a first end of the master piston, wherein the gasket has a gasket center hole; wherein the gasket is configured to form a seal on a mouth of a cartridge case;
        a coil spring located inside the master cylinder between the master piston and the closed end of the master cylinder;
        a piston retention cap coupled to the open end of the master cylinder, wherein the piston retention cap has a piston retention cap center hole; and
        a first pressure sensor pneumatically coupled to an interior of the master cylinder.

2. The cartridge case volume measurement system of claim 1 further comprising:
    a communication cable coupled to the first pressure sensor; and
    a computing device coupled to the communication cable, wherein the computing device is configured for determining a volume of the cartridge case based on measurements from the first pressure sensor and calibration data.

3. The cartridge case volume measurement system of claim 2 further comprising:
    a second pressure sensor configured to measure ambient pressure, wherein the second pressure sensor is coupled to the computing device via the communication cable;
    wherein the first pressure sensor is a differential pressure sensor configured to measure a difference in pressure between the interior of the master cylinder and ambient; and
    wherein the computing device is further configured for determining the volume of the cartridge case based on measurements from the second pressure sensor.

4. The cartridge case volume measurement system of claim 1,
    wherein the piston retention cap center hole is large enough to allow the cartridge case to pass through, but small enough to prevent the master piston from passing through.

5. The cartridge case volume measurement system of claim 1,
    wherein the cartridge case volume measurement assembly further comprises a gasket retention cap coupled to the first end of the master piston, wherein the gasket retention cap has a gasket retention cap center hole, wherein the gasket retention cap center hole is large enough to allow the mouth of the cartridge case to pass through, but small enough to prevent the gasket from passing through.

6. The cartridge case volume measurement system of claim 1,
    wherein the piston retention cap center hole is large enough to allow the cartridge case to pass through, but small enough to prevent the master piston from passing through; and
    wherein the cartridge case volume measurement assembly further comprises a gasket retention cap coupled to the first end of the master piston, wherein the gasket retention cap has a gasket retention cap center hole, wherein the gasket retention cap center hole is large enough to allow the mouth of the cartridge case to pass through, but small enough to prevent the gasket from passing through.

7. The cartridge case volume measurement system of claim 1,
    wherein the master cylinder closed end has a master cylinder closed end center hole coupled to the first pressure sensor.

8. The cartridge case volume measurement system of claim 7,
    wherein the gasket center hole, the master piston center hole, and the master cylinder closed end center hole are configured to allow air to pass through regardless of a position of the master piston within the master cylinder.

9. The cartridge case volume measurement system of claim 1,
wherein the master piston has a raised boss on a second end of the master cylinder opposite the first end, wherein the raised boss has a cross-section smaller than an inside diameter of the master cylinder.

10. The cartridge case volume measurement system of claim 1,
wherein the master cylinder has threads on its outside surface configured to engage with the threads in the die hole in the reloading press.

11. A cartridge case volume measurement system comprising:
a cartridge case volume measurement assembly having:
a master cylinder with an open end and a closed end, wherein the master cylinder is configured for coupling to a die hole in a reloading press, wherein the master cylinder is configured to form a seal on a mouth of a cartridge case;
a secondary cylinder coupled to the master cylinder to allow air to pass between the secondary cylinder and the master cylinder;
a secondary piston fit slidingly inside the secondary cylinder, wherein the secondary piston is configured to force a predetermined volume of air from the secondary cylinder to the master cylinder; and
a first pressure sensor pneumatically coupled to an interior the master cylinder.

12. The cartridge case volume measurement system of claim 11 further comprising:
a communication cable coupled to the first pressure sensor; and
a computing device coupled to the communication cable, wherein the computing device is configured for determining a volume of the cartridge case based on measurements from the first pressure sensor and calibration data.

13. The cartridge case volume measurement system of claim 12 further comprising:
a second pressure sensor configured to measure ambient pressure, wherein the second pressure sensor is coupled to the computing device via the communication cable;
wherein the first pressure sensor is a differential pressure sensor configured to measure a difference in pressure between the interior of the master cylinder and ambient; and
wherein the computing device is further configured for determining the volume of the cartridge case based on measurements from the second pressure sensor.

14. The cartridge case volume measurement system of claim 11,
wherein the master cylinder has threads on its outside surface configured to engage with the threads in the die hole in the reloading press.

* * * * *